United States Patent
Moribayashi (10) Patent No.: US 9,641,000 B2
(45) Date of Patent: May 2, 2017

(54) SEMICONDUCTOR DEVICE (71) Applicant: RENESAS ELECTRONICS CORPORATION, Kawasaki-shi, Kanagawa (JP)

(72) Inventor: Shigeru Moribayashi, Kanagawa (JP)

(73) Assignee: Renesas Electronics Corporation, Koutou-ku, Tokyo (JP)

( * ) Notice: Subject to any disclaimer, the term of this patent is extended or adjusted under 35 U.S.C. 154(b) by 903 days.

(21) Appl. No.: 13/958,764

(22) Filed: Aug. 5, 2013

(65) Prior Publication Data
US 2014/0077588 A1    Mar. 20, 2014

(30) Foreign Application Priority Data

Sep. 18, 2012   (JP) ................................. 2012-204734

(51) Int. Cl.
| | | |
|---|---|---|
| H03K 3/00 | (2006.01) | |
| H02J 5/00 | (2016.01) | |
| H04L 25/02 | (2006.01) | |
| H04L 25/49 | (2006.01) | |

(52) U.S. Cl.
CPC ............ H02J 5/00 (2013.01); H04L 25/0272 (2013.01); H04L 25/4906 (2013.01)

(58) Field of Classification Search
None
See application file for complete search history.

(56) References Cited

U.S. PATENT DOCUMENTS

| 7,741,935 B2 | 6/2010 | Chow et al. | |
|---|---|---|---|
| 7,755,400 B2 | 7/2010 | Jordanger et al. | |
| 2002/0171455 A1* | 11/2002 | Tsuchida | H03K 4/94 327/108 |
| 2011/0085621 A1* | 4/2011 | Yamamoto | H03F 3/45183 375/317 |
| 2014/0077588 A1* | 3/2014 | Moribayashi | H02J 5/00 307/2 |

FOREIGN PATENT DOCUMENTS

| JP | 2003-142996 A | 5/2003 |
|---|---|---|
| JP | 2010-16815 A | 1/2010 |

* cited by examiner

Primary Examiner — Lincoln Donovan
Assistant Examiner — Khareem E Almo
(74) Attorney, Agent, or Firm — Sughrue Mion, PLLC (57) ABSTRACT

A semiconductor device includes a first nonlinear element, an differential amplifier that generates a differential signal from a signal output by the first nonlinear element; a first and second insulating elements that are connected to a non-inverting signal output terminal and an inverting signal output terminal of the differential amplifier, respectively; first to third nonlinear elements each outputting a first logic level if the received signal is equal to or larger than a given threshold value, and outputting a second logic level if the received signal is smaller than the given threshold value; and a logic circuit that outputs the logic level output by the second nonlinear element if the logic levels output by the second and third nonlinear elements are different from each other, and makes the logic level of the output signal unchangeable when the second and third nonlinear elements output the same logic level.

19 Claims, 10 Drawing Sheets

| QSp | QSn | OUTPUT OF LOGIC CIRCUIT 10 |
|---|---|---|
| H | L | H |
| L | H | L |
| L | L | HELD |
| H | H | HELD |

SEMICONDUCTOR DEVICE

CROSS-REFERENCE TO RELATED APPLICATIONS

The disclosure of Japanese Patent Application No. 2012-204734 filed on Sep. 18, 2012 including the specification, drawings, and abstract is incorporated herein by reference in its entirety.

BACKGROUND

The present invention relates to a semiconductor device, which can be preferably used in, for example, a semiconductor device that isolates a transmitter and a receiver from each other A sequence control that controls production equipments according to a predetermined procedure has been extensively used. Power supplies used for those production equipments are frequently very high in voltage. On the other hand, a control signal is supplied to those production equipments, and a high-voltage power supply is required for a control device. That is, it is sufficient to supply a power supply for operating a logic circuit included in the control device to the control device. Under those circumstances, there is used an isolator circuit (isolator) that transmits the control signal while isolating power supply regions different in voltage from each other.

Also, it is conceivable that a variety of noises are generated under the environment where the insulator circuit is used, and the insulator circuit that precisely transmits the control signal without being affected by those noises is demanded.

Japanese Unexamined Patent Application Publication No. 2003-142996 discloses a differential signal receiver circuit (insulator circuit) that transmits a digital signal using a differential signal. The insulator circuit disclosed in Japanese Unexamined Patent Application Publication No. 2003-142996 isolates a transmitter side from a receiver side using a photocoupler.

Further, U.S. Pat. No. 7,755,400 and Japanese Unexamined Patent Application Publication No. 2010-16815 disclose insulator circuits that isolate the transmitter side and the receiver side from each other using a capacitor. In order to realize the transmission of a direct current signal (DC signal), the insulator circuits disclosed in these patent documents separate a DC signal path and an alternating current signal (AC signal) path from each other. Also, in order to realize the transmission of the DC signal, a pulse signal is added on the transmitter side, and the added pulse signal is removed on the receiver side.

In this example, when a potential of one electrode is changed, the capacitor can transmit the change to the other electrode (AC signal can be transmitted). However, the DC signal having no change in the potential cannot be transmitted to the other electrode. For that reason, the above-mentioned configuration (separation of the paths, addition of the pulse signal) is required for the insulator circuits disclosed in U.S. Pat. No. 7,755,400 and Japanese Unexamined Patent Application Publication No. 2010-16815.

SUMMARY

The respective disclosures of the above related art documents are incorporated herein by reference in its entirety. The following analysis has been conducted by the present inventors.

As described above, the insulator circuit disclosed in Japanese Unexamined Patent Application Publication No. 2003-142996 isolates the transmitter and the receiver from each other using the photocoupler. Because of the insulation using the photocouple, the configurations of the insulator circuits disclosed in U.S. Pat. No. 7,755,400 and the Japanese Unexamined Patent Application Publication No. 2010-16815 are unnecessary. That is, if the photocouple is provided, the DC signal can be transmitted to the transmitter side, and there is no need to separate the paths between the DC signal and the AC signal. Also, there is no need to add the pulse signal to the input signal.

However, a size of the photocoupler as an insulating element is extremely large as compared with the capacitor. For that reason, a substrate area necessary for mounting the photocoupler thereon is also increased, and an area of the insulator circuit using the photocoupler as the insulating element is enlarged. Further, if prices are compared between the photocoupler and the capacitor, the price of the photocoupler is normally higher, and the costs of the insulator circuit also rise.

From the above viewpoints, a semiconductor device that suppresses an increase in a mounting area and the costs, and isolates the transmitter and the receiver from each other is desired. The other problems and novel features will become apparent from the description of the present specification and the attached drawings.

According to an aspect of this invention, there is provided a semiconductor device including a first nonlinear element, an differential amplifier, a first insulating element, a second insulating element, a second nonlinear element, a third nonlinear element, and a logic circuit. The first nonlinear element outputs a first logic level if a potential of an input signal is equal to or larger than a given threshold value, and outputs a second logic level if the potential of the input signal is smaller than the given threshold value. The differential amplifier generates a differential signal from a signal output by the first nonlinear element. The first insulating element has one end connected to a non-inverting signal output terminal of the differential amplifier. The second insulating element has one end connected to an inverting signal output terminal of the differential amplifier. The second nonlinear element is connected to the other end of the first insulating element, outputs the first logic level if a potential of a non-inverting signal output by the differential amplifier is equal to or larger than the given threshold value, and outputs the second logic level if the potential of the non-inverting signal is smaller than the given threshold value. The third nonlinear element is connected to the other end of the second insulating element, outputs the first logic level if the potential of an inverting signal output by the differential amplifier is equal to or larger than the given threshold value, and outputs the second logic level if the potential of the inverting signal is smaller than the given threshold value. The logic circuit outputs a logic level output by the second nonlinear element if the logic levels output by the second and third nonlinear elements are different from each other, and makes the logic level of the output signal unchangeable if the second and third nonlinear elements output the same logic level.

According to the aspect of the invention, there is provided the semiconductor device that suppresses an increase in the mounting area and the costs, and isolates the transmitter and the receiver from each other.

DETAILED DESCRIPTION

First, an outline of one embodiment will be described with reference to FIG. 1. Reference symbols in the drawings attached to the outline are expedientially attached to the respective elements as an example for facilitating understanding, and the description of the outline is not intended to limit the invention.

As described above, the insulator circuit using the photocoupler suffers from such problems that the mounting area is increased, and the costs of the insulating circuit rise. Under the circumstances, the semiconductor device that suppresses an increase in the mounting area and the costs, and isolates the transmitter and the receiver from each other is desirable.

Figure 1:
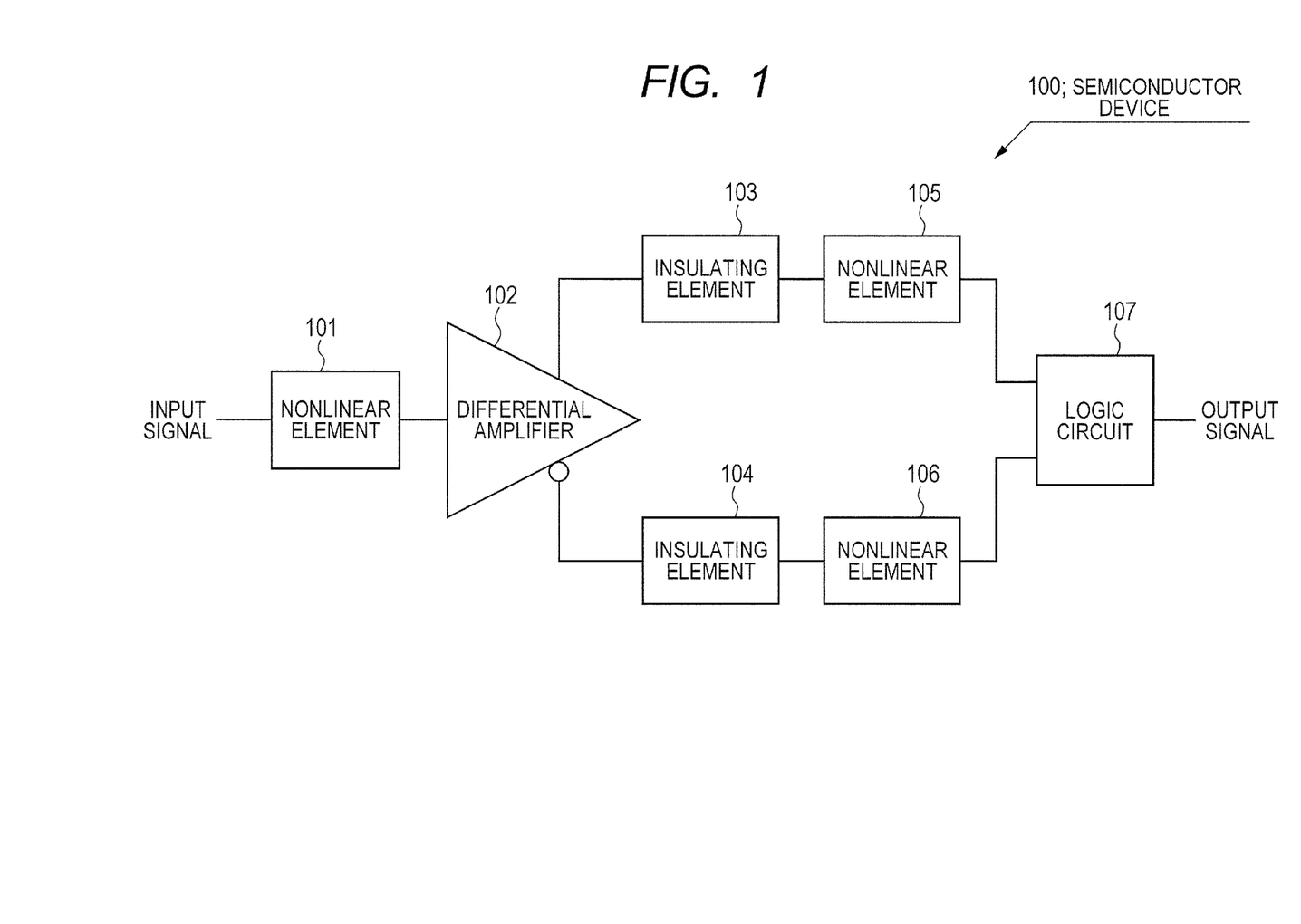
FIG. 1 is a diagram illustrating an outline of an embodiment.

From the above viewpoints, a semiconductor device 100 illustrated in FIG. 1 is provided as an example. The semiconductor device 100 includes a first nonlinear element 101, a differential amplifier 102, a first insulating element 103, a second insulating element 104, a second nonlinear element 105, a third nonlinear element 106, and a logic circuit 107. The first nonlinear element 101 outputs a first logic level if a potential of an input signal is equal to or larger than a given threshold value, and outputs a second logic level if the potential of the input signal is smaller than the given threshold value. The differential amplifier 102 generates a differential signal from the signal output by the first nonlinear element 101. The first insulating element 103 has one end connected to a non-inverting signal output terminal of the differential amplifier 102. The second insulating element 104 has one end connected to an inverting signal output terminal of the differential amplifier 102. The second nonlinear element 105 is connected to the other end of the first insulating element 103, outputs the first logic level if the potential of the non-inverting signal output by the differential amplifier 102 is equal to or larger than the given threshold value, and outputs the second logic level if the potential of the non-inverting signal is smaller than the given threshold value. The third nonlinear element 106 is connected to the other end of the second insulating element 104, outputs the first logic level if the potential of the inverting signal output by the differential amplifier 102 is equal to or larger than the given threshold value, and outputs the second logic level if the potential of the inverting signal is smaller than the given threshold value. The logic circuit 107 outputs the logic level output by the second nonlinear element 105 if the logic levels output by the second nonlinear element 105 and the third nonlinear element 106 are different from each other, and makes the logic level of the output signal unchangeable if the second nonlinear element 105 and the third nonlinear element 106 output the same logic level.

The semiconductor device 100 isolates a transmitter and a receiver from each other using the nonlinear element and the insulating element. For that reason, even if an element such as a capacitor or a coil which cannot transmit the DC signal is used as an insulating element, a change in the input signal can be converted into a pulse signal using the nonlinear element. The input signal (differential signal) converted into the pulse signal is subjected to logical operation by the logic circuit 107 to output the output signal having the same logic level as that of the input signal. In this way, in the semiconductor device 100, because there is no need to use an element such as the photocoupler as the insulating element, the mounting area is not increased, there is no case in which the mounting area increases, and the costs of the insulator circuit rise as in the insulator circuit using the photocoupler.

Further, the following configurations are enabled.

[Configuration 1]

A semiconductor device according to the above first embodiment.

[Configuration 2]

It is preferable to provide an input monitoring circuit that allocates a single pulse signal to any one of the non-inverting signal and the inverting signal when the logic level of the input signal is configured for a given time or longer.

[Configuration 3]

It is preferable to allow the differential amplifier to generate the single pulse signal if the logic level of the input signal is continued for the given period or longer.

[Configuration 4]

It is preferable that the input monitoring circuit allows the single pulse signal to be generated from the non-inverting signal output terminal of the differential amplifier if the output of the first nonlinear element is the first logic level, and allows the single pulse signal to be generated from the inverting signal output terminal of the differential amplifier if the output of the first nonlinear element is the second logic level.

[Configuration 5]

It is preferable that the logic circuit includes an AND circuit, an exclusive OR circuit, and first to fourth NAND circuits, the AND circuit receives a signal obtained by inverting a logic of the signal output by the second nonlinear element and the signal output by the third nonlinear element, the AND circuit receives a signal obtained by inverting a logic of the signal output by the second nonlinear element and the signal output by the third nonlinear element, the exclusive OR circuit receives signals output by the second and third nonlinear elements, the first NAND circuit receives the signals output by the AND circuit and the exclusive OR circuit, the second NAND circuit receives the signals output by the first NAND circuit and the exclusive OR circuit, the third NAND circuit receives the signals output by the first NAND circuit and the fourth NAND circuit, the fourth NAND circuit receives the signals output by the second NAND circuit and the third NAND circuit, and the signal output by the third NAND circuit is the output signal.

[Configuration 6]

It is preferable that the input monitoring circuit includes a pulse generator circuit, a counter circuit, first and second NOR circuits, first and second flip-flops, and fifth and sixth NAND circuits, the pulse generator circuit supplies a pulse signal having a given cycle to the counter circuit, the counter circuit activates the control signal when counting the pulse signal supplied from the pulse generator circuit up to a predetermined count value, the first NOR circuit receives the signal output by the first nonlinear element, and the control signal, the second NOR circuit receives a signal obtained by inverting a logic of the signal output by the first nonlinear element, and the control signal, the first flip-flop receives the control signal at a reset terminal, and receives the output of the first NOR circuit at a set terminal, the second flip-flop receives the control signal at a reset terminal, and receives the output of the second NOR circuit at a set terminal, the fifth NAND circuit receives the signal output from an inverting data terminal of the first flip-flop, and the control signal, the sixth NAND circuit receives the signal output from an inverting data terminal of the second flip-flop, and the control signal, the differential amplifier includes second and third AND circuits, the second AND circuit outputs a signal obtained by ANDing the signal output from the non-inverting signal output terminal, and the signal output from the fifth NAND circuit as the non-inverting signal, and the third AND circuit outputs a signal obtained by ANDing the signal output from the inverting signal output terminal, and the signal output from the sixth NAND circuit as the inverting signal.

[Configuration 7]

It is preferable that the first and second insulating elements each include an element that differentiate a change in physical quantity on one terminal thereof, and outputs the differentiated result to the other terminal thereof.

[Configuration 8]

A semiconductor device, including: a first nonlinear element that receives an input signal; a differential amplifier that generates a differential signal from a signal output by the first nonlinear element; first and second insulating elements each having one end connected to an output node of the differential amplifier; second and third nonlinear elements each having an input node connected to the other ends of the first and second insulating elements, and output a single pulse signal according to a rising of the output signal of the differential amplifier; and a logic circuit that updates a logic level of the output signal to a logic level of the input signal when detecting a difference of the logic level between the signals output by the second and third nonlinear elements.

[Configuration 9]

It is preferable that the logic circuit makes the logic level of the output signal unchangeable when detecting matching of the logic levels of the signals output by the second and third nonlinear elements.

Hereinafter, specific embodiments will be described in more detail with reference to the accompanying drawings.

First Embodiment

A first embodiment will be described in more detail with reference to the accompanying drawings.

Figure 2:
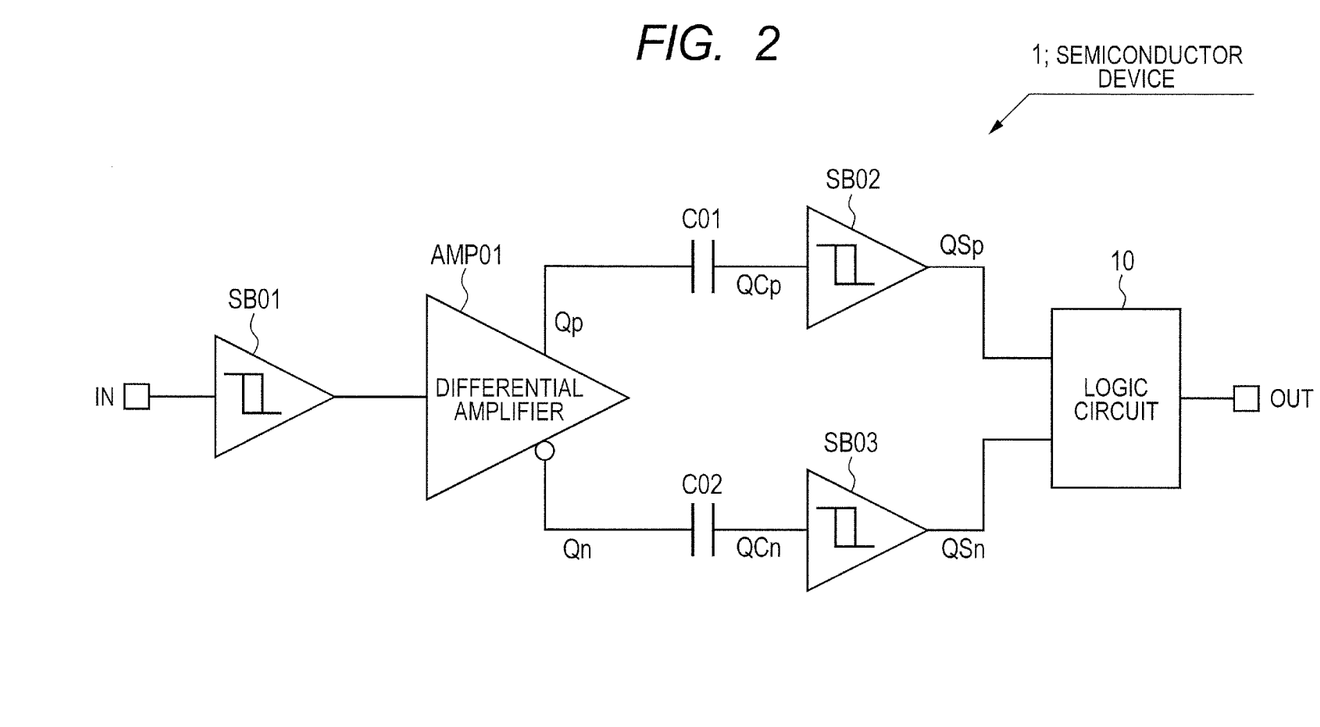
FIG. 2 is a diagram illustrating an example of a circuit configuration of a semiconductor device according to a first embodiment.

FIG. 2 is a diagram illustrating an example of a circuit configuration of a semiconductor device according to the first embodiment.

A semiconductor device 1 includes a logic circuit 10, a differential amplifier AMP01, Schmitt buffers SB01 to SB03, and capacitors C01, C02.

The semiconductor device 1 isolates an input terminal IN side and an output terminal OUT side from each other by the capacitors C01, C02. The semiconductor device 1 receives an input signal from a transmitter (not shown) through the input terminal IN. Also, the semiconductor device 1 outputs the output signal having the same logic as that of the input signal to a receiver (not shown) through the output terminal OUT.

The capacitors C01 and C02 are insulating elements that block a DC signal, and allow passage of an AC signal. The insulating elements used in the semiconductor device 1 are not limited to the capacitors. As will be described later, the coil can be used as the insulating element. The insulating elements available in the semiconductor device 1 should be understood as elements that differentiate a change in physical quantity at one terminal, and output the differentiated result to the other terminal.

The Schmitt buffers SB01 to SB03 are nonlinear elements that output H level when an input potential at an input node exceeds a first threshold value, and outputs L level when the input potential falls below a second threshold value. However, the nonlinear elements used in the semiconductor device 1 are not limited to the Schmitt buffers. The nonlinear elements available in the semiconductor device 1 have only to provide a hysteresis characteristic having different threshold values.

The input terminal IN is connected to the input node of the Schmitt buffer SB01. The differential amplifier AMP01 receives an input signal (single-phase signal) output by the Schmitt buffer SB01, and outputs a differential signal from the non-inverting signal output terminal and the inverting signal output terminal. In the following description, the non-inverting signal output by the differential amplifier AMP01 is represented as Qp, and the inverting signal is represented as Qn.

The non-inverting signal output terminal of the differential amplifier AMP01 is connected to an electrode of the capacitor C01. The other electrode of the capacitor C01 is connected to an input node of the Schmitt buffer SB02. Likewise, the non-inverting signal output terminal of the differential amplifier AMP01 is connected to an electrode of capacitor C02, and the other electrode of the capacitor C02 is connected to an input node of the Schmitt buffer SB03. In the following description, signals that are received by the input nodes of the Schmitt buffers SB02 and SB03 are represented as a non-inverting signal QCp and an inverting signal QCn, respectively.

The output nodes of the Schmitt buffers SB02 and SB03 are connected to the input node of the logic circuit 10. The output node of the logic circuit 10 is connected to the output terminal OUT. In the following description, the signals output by the Schmitt buffers SB02 and SB03 are represented by a non-inverting signal QSp and an inverting signal QSn, respectively.

The logic circuit 10 has a function of outputting a signal having the same logic level as that of the non-inverting signal QSp as the output signal if the logic levels of the non-inverting signal QSp and the inverting signal QSn are different from each other. Further, the logic circuit 10 has a function of not changing the logic level of the output signal (making the logic level of the output signal unchangeable) if the logic levels of the non-inverting signal QSp and the inverting signal QSn are identical with each other.

Subsequently, an internal configuration of the logic circuit 10 will be described.

Figure 3:
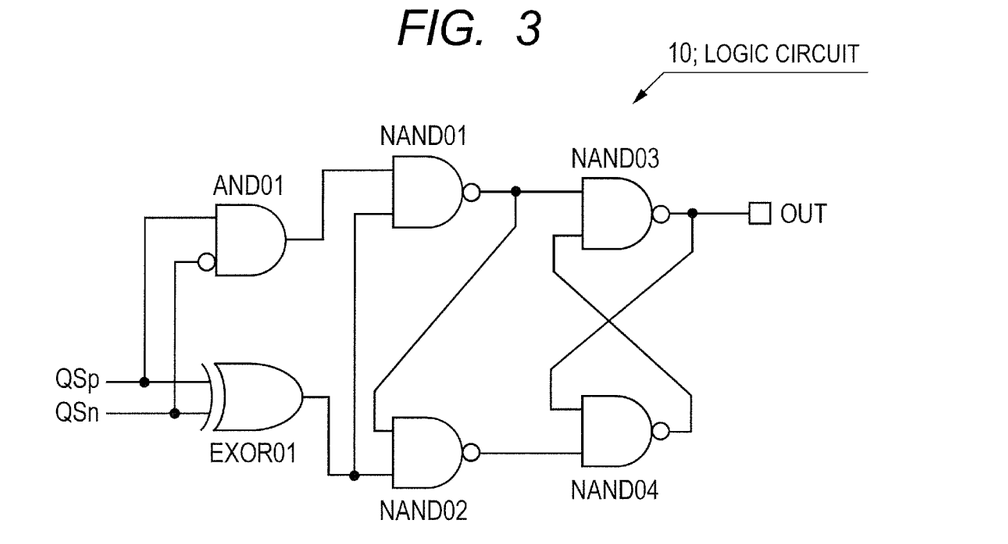
FIG. 3 is a diagram illustrating an example of an internal configuration of a logic circuit.

FIG. 3 is a diagram illustrating an example of the internal configuration of the logic circuit 10.

The logic circuit 10 includes an AND circuit AND01, an exclusive OR circuit EXOR01, and NAND circuits NAND01 to NAND04. FIG. 3 illustrates a specific example of the logic circuit 10, and does not limit the circuit configuration of the logic circuit 10. The logic circuit 10 may be configured by any circuit if the circuit outputs a signal having the same logic level as that of one input signal as the output signal if the logic levels of the input signals are different from each other, and does not change the logic level of the output signal if the logic levels of the input signals are identical with each other.

The exclusive OR circuit EXOR01 receives the non-inverting signal QSp and the inverting signal QSn. Also, the AND circuit AND01 receives a signal obtained by inverting a logic of the non-inverting signal QSp and the inverting signal QSn. The NAND circuit NAND01 receives signals output by the AND circuit AND01 and the exclusive OR circuit EXOR01. The NAND circuit NAND02 receives the signals output by the NAND circuit NAND01 and the exclusive OR circuit EXOR01. The NAND circuit NAND03 receives the signals output by the NAND circuit NAND01 and the NAND circuit NAND04. The NAND circuit NAND04 receives the signals output by the NAND circuit NAND02 and the NAND circuit NAND03. The signal output by the NAND circuit NAND03 is the output signal of the logic circuit 10, and output to the receiver from the output terminal OUT.

Figure 4:
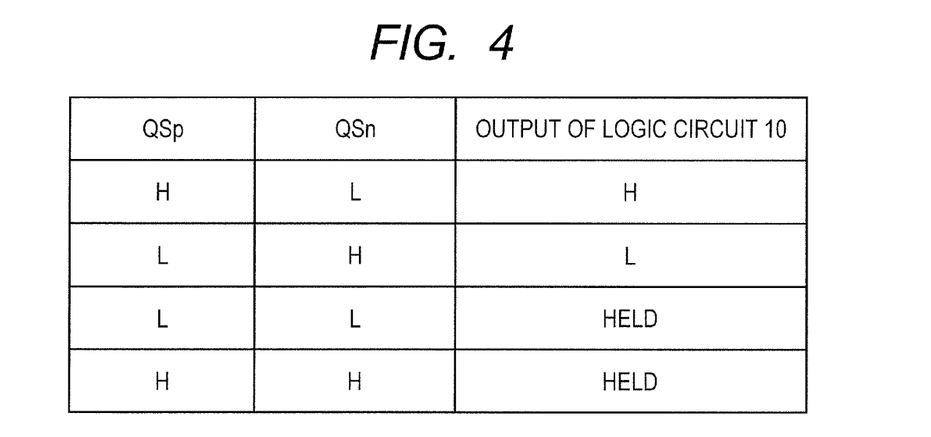
FIG. 4 is a table illustrating logic levels of input/output signals in the logic circuit.

FIG. 4 is a table illustrating logic levels of input/output signals in the logic circuit 10.

The logic circuit 10 determines the logic level of the output signal according to the logic levels of the input non-inverting signal QSp and inverting signal QSn. That is, the logic circuit 10 conducts the operation in conformity with truth table of FIG. 4.

The logic circuit 10 outputs a signal having the logic level of the non-inverting signal QSp if the logic levels of the non-inverting signal QSp and the inverting signal QSn are different from each other (first and second columns in FIG. 4). The logic circuit 10 holds the logic level of the output signal if the logic levels of the non-inverting signal QSp and the inverting signal QSn are identical with each other (third and fourth columns in FIG. 4) (logic level is not changed).

Subsequently, the operation of the semiconductor device 1 will be described.

Figure 5:
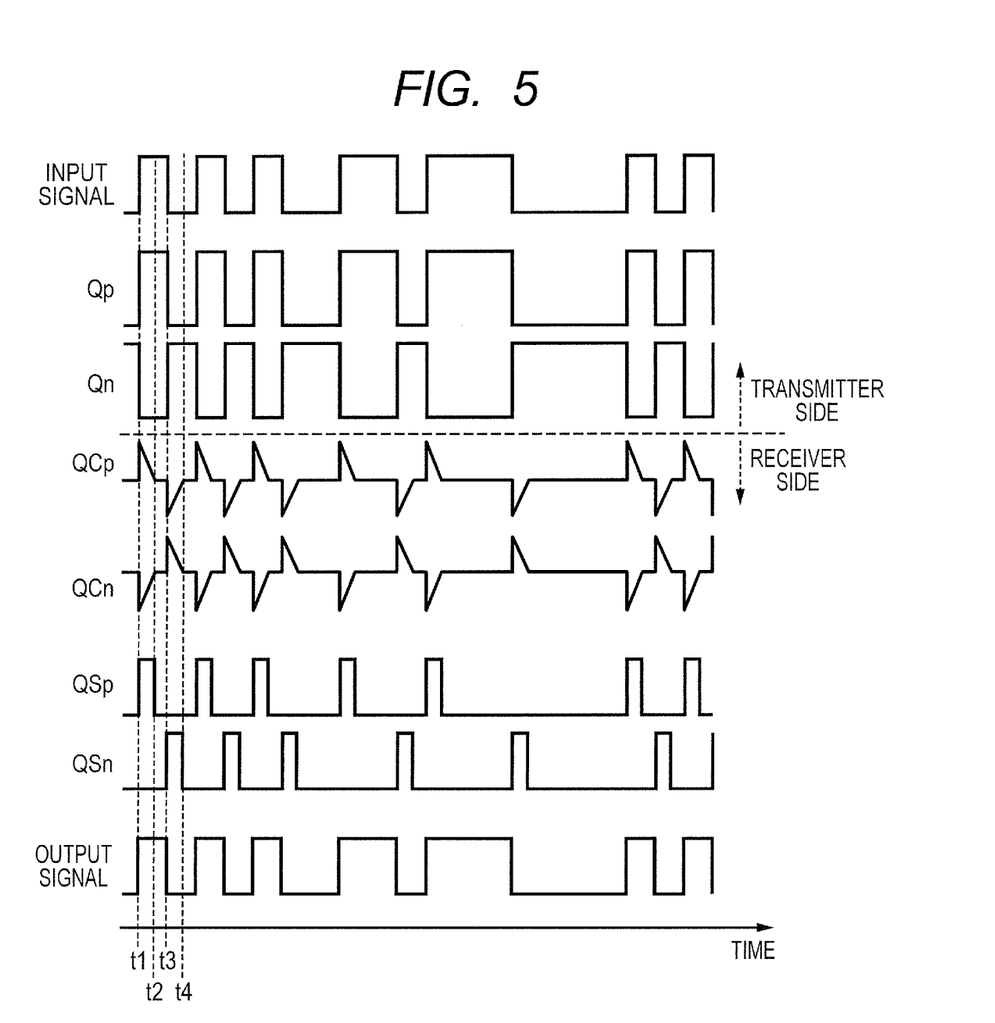
FIG. 5 is a diagram illustrating one example of various signals in the semiconductor device.
Figure 6:
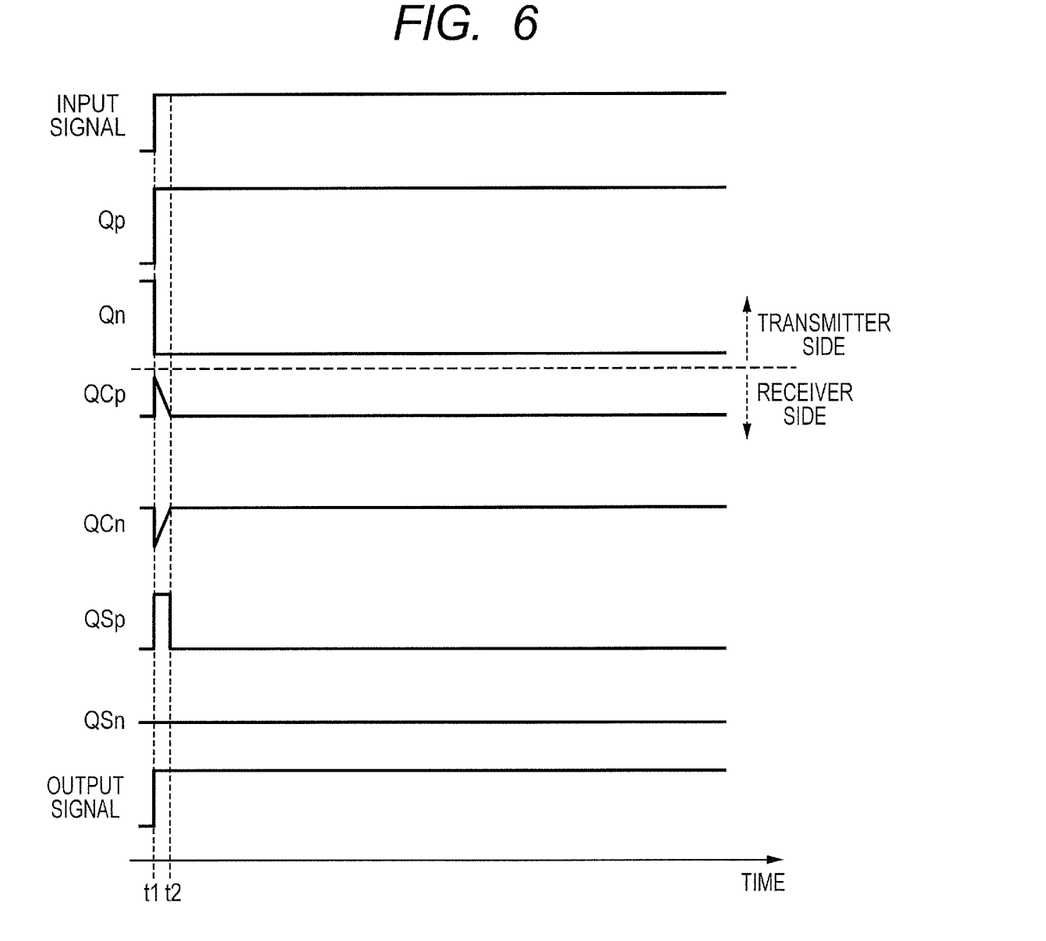
FIG. 6 is a diagram illustrating another example of various signals in the semiconductor device.
Figure 10:
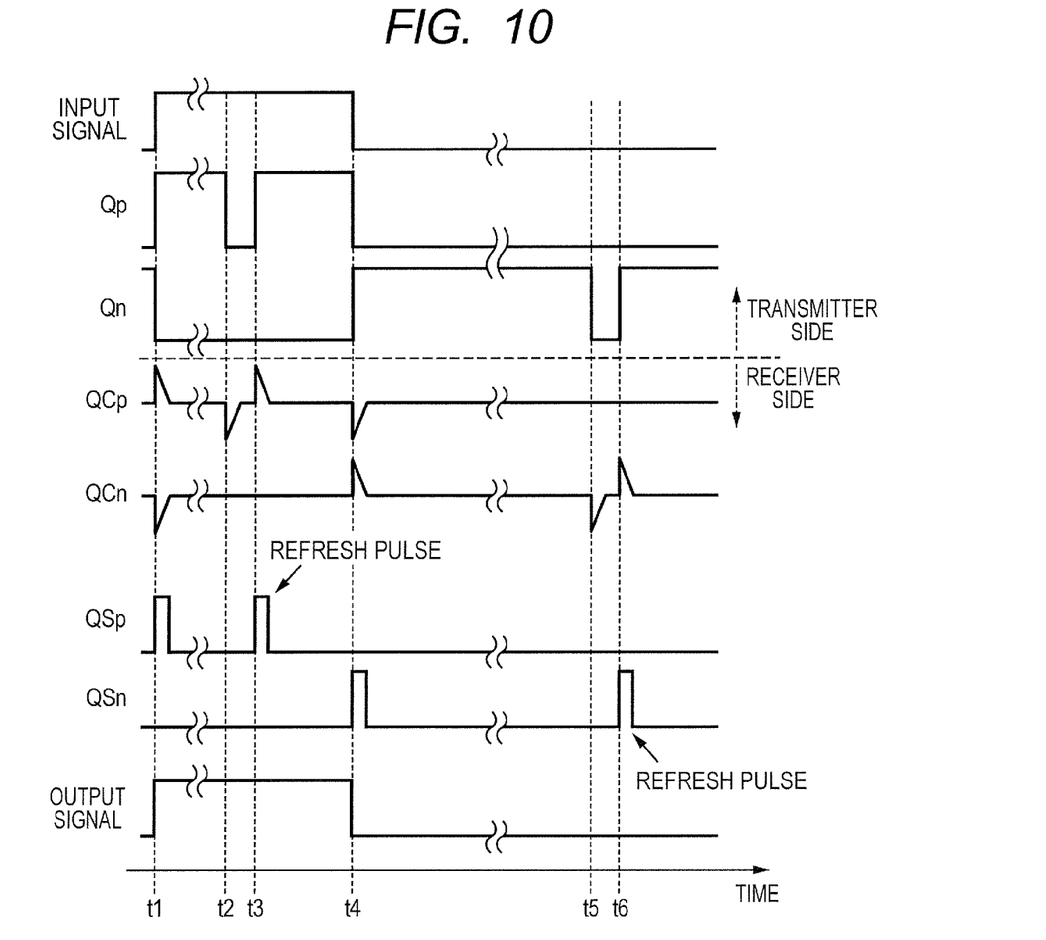
FIG. 10 is a diagram illustrating an example of various signals in the semiconductor device.

FIG. 5 is a diagram illustrating one example of various signals in the semiconductor device 1. Referring to FIGS. 5, 6, and 10, a notion of a ground voltage is not illustrated, but the grounds of the input terminal IN side (transmitter side) and the output terminal OUT side (receiver side) may be common to or different from each other.

At a time t1, the input signal transitions from the L level to the H level. As a result, since a potential of the input signal exceeds the first threshold value of the Schmitt buffer SB01, the signal of the H level is input to the differential amplifier AMP01. The differential amplifier AMP01 converts the input signal output by the Schmitt buffer SB01 into a differential signal, and outputs the differential signal. More specifically, at the time t1, a non-inverting signal Qp transitions to the H level, and an inverting signal Qn transitions to the L level.

Those signals are differentiated by the capacitors C01 and C02, and the non-inverting signal QCp and the inverting signal QCn become differentiated waveforms illustrated in FIG. 5. In this situation, since the potential of the non-inverting signal QCp input to the Schmitt buffer SB02 exceeds the first threshold value, the non-inverting signal QSp output by the Schmitt buffer SB02 becomes H level. However, since the potential of the inverting signal QCn input to the Schmitt buffer SB03 does not exceed the first threshold value, the potential is maintained at the L level. That is, the non-inverting signal QSp output by the Schmitt buffer SB02 transitions to the H level according to a rising edge of the non-inverting signal QCp.

At the time t1, since the non-inverting signal QSp of the H level and the inverting signal QSn of the L level are input to the logic circuit 10, the output signal becomes the same H level as the logic level of the non-inverting signal QSp (refer to first column in FIG. 4).

Therefore, the potential of the non-inverting signal QCp falls below the second threshold value, and the non-inverting signal QSp output by the Schmitt buffer SB02 becomes L level at a time t2. In this situation, since the non-inverting signal QSp and the inverting signal QSn of the L level are input to the logic circuit 10, the logic circuit 10 is maintained at the H level which is the logic level at the time t1 (refer to third column in FIG. 4).

In this way, the non-inverting signal QSp output by the Schmitt buffer SB02 becomes a single pulse signal according to the rising of the input signal. On the other hand, the inverting signal QSn output by the Schmitt buffer SB03 is maintained at the L level.

Thereafter, at a time t3, the input signal transitions from the H level to the L level. Since the potential of the inverting signal QCn input to the Schmitt buffer SB03 exceeds the first threshold value according to a change in the input signal, the inverting signal QSn output by the Schmitt buffer SB03 becomes the H level. That is, the inverting signal QSn output by the Schmitt buffer SB03 transitions to the H level according to a rising edge of the inverting signal QCn. In this case, since the non-inverting signal QSp of the L level and the inverting signal QSn of the H level are input to the logic circuit 10, the output signal becomes the same L level as the logic level of the non-inverting signal QSp (refer to second column in FIG. 4).

Thereafter, the potential of the inverting signal QCn falls below the second threshold value, and at a time t4, the inverting signal QSn output by the Schmitt buffer SB03 becomes the L level. In this situation, since the non-inverting signal QSp and the inverting signal QSn of the L level are input to the logic circuit 10, the logic circuit 10 is maintained at the L level which is the logic level of the time t3 (refer to third column in FIG. 4). The above operation is conducted when the AC signal is input to the semiconductor device 1.

Subsequently, a case in which the DC signal is input to the semiconductor device 1 will be described.

FIG. 6 is a diagram illustrating another example of the various signals in the semiconductor device 1.

Even if the DC signal is input to the semiconductor device 1, the operation of the semiconductor device 1 is not different from that when the AX signal is input thereto. Even if the DC signal is input thereto, if a change in the potential of the input signal at the time t1 is differentiated in the capacitor C01, and the rising edge is input to the Schmitt buffer SB02, the same operation as that when the AC signal is input thereto is conducted.

Subsequently, a feature that the semiconductor device 1 has a high resistance characteristic against noise will be described.

In this example, a case in which a common mode noise or a normal mode noise is superimposed on a signal path between the differential amplifier AMP01 and the logic circuit 10 will be verified.

First, a case in which the common mode noise is superimposed on the signal path will be described.

In verifying an influence of the case in which the common mode noise is superimposed on the signal path, the circuit and the layout including the capacitors C01, C02, the Schmitt buffers SB02, SB03, and wirings are symmetrically designed with respect to the non-inverting signal output terminal and the inverting signal output terminal of the differential amplifier AMP01.

When the common mode noise is superimposed on the signal path, the noises of the same amount are superimposed on the respective portions due to the symmetry of the circuit, and both of the non-inverting signals (QCp, QSp) and the inverting signals (QCn, QSn) become H level or L level. Now, a case in which both of those signals become H level will be considered.

In this case, the logic circuit 10 does not change the logic level of the output signal in conformity with the truth table illustrated in FIG. 4 (refer to fourth column in FIG. 4). Therefore, the output signal is still maintained at the H level, and even if the common mode noise is superimposed on the above signal path, an influence of the superimposition is not actualized. Also, if the common mode noise is superimposed on the above signal path, the same is applied to a case in which both of the input nodes of the logic circuit 10 become L level (refer to third column in FIG. 4).

Subsequently, a case in which the normal mode noise is superimposed on the signal path will be considered.

Even if the normal mode noise is superimposed on the above signal path, and any logic level of the non-inverting signals (QCp, QSp) and the inverting signals (QCn, QSn) changes, an influence of the change is definite. For example, when the non-inverting signal QSp transitions to the L level, and the inverting signal QSn also transitions to the L level, the logic level of the output signal is not changed according to the logic at the third column of FIG. 4. Likewise, the same is applied to the case in which both of the non-inverting signal QSp and the inverting signal QSn become H level.

In this way, the semiconductor device 1 has the high resistance characteristic against any noise of the common mode noise and the normal mode noise.

As described above, in the semiconductor device 1 according to this embodiment, the capacitors which are insulating elements excellent in both of the mounting area and the costs are used to isolate the transmitter and the receiver from each other. Also, a given logical operation is conducted by the logic circuit 10 to provide an extremely high resistance property against the noise. That is, there can be provided the insulator circuit smaller in the substrate area, and more excellent in the costs than the insulator circuit disclosed in Japanese Unexamined Patent Application Publication No. 2003-142996.

Further, there is no need to separate the paths between the DC signal and the AC signal. Also, because there is no need to add the pulse signal to the DC signal, no filter circuit for removing the pulse signal is required. Furthermore, in the insulator circuits disclosed in U.S. Pat. No. 7,755,400 and Japanese Unexamined Patent Application Publication No. 2010-16815, because the paths are separated between the DC signal and the AC signal, a larger number of insulating elements is required. More specifically, four insulating elements (capacitors) are required. However, the semiconductor device 1 according to this embodiment only needs two capacitors.

Further, when the paths are separated between the DC signal and the AC signal as in the insulator circuit disclosed in U.S. Pat. No. 7,755,400 and the Japanese Unexamined Patent Application Publication No. 2010-16815, there is a risk that a first bit of the AC signal lacks in switching from the DC signal to the AC signal. In order to avoid the above problem, a delay circuit is required in the circuits disclosed in U.S. Pat. No. 7,755,400 and Japanese Unexamined Patent Application Publication No. 2010-16815. However, in the semiconductor device 1 according to this embodiment, it is possible to equivalently deal with the DC signal and the AC signal, and the delay circuit is unnecessary.

From the above viewpoints, the semiconductor device 1 according to this embodiment is excellent in both of the substrate area and the costs as compared with the insulator circuits disclosed in U.S. Pat. No. 7,755,400 and Japanese Unexamined Patent Application Publication No. 2010-16815.

Also, in the insulator circuits disclosed in U.S. Pat. No. 7,755,400 and Japanese Unexamined Patent Application Publication No. 2010-16815, there is a possibility that the insulator circuit malfunctions depending on the logic level before the noise is superimposed on the signal path (easily affected by the noise). However, the semiconductor device 1 according to this embodiment has the extremely high resistance property against all of the common mode noise and the normal mode noise.

Second Embodiment

Subsequently, a second embodiment will be described in detail with reference to the drawings.

In the semiconductor device 1 according to the first embodiment, there is a possibility that malfunction occurs when turning on a power supply. That is, when the DC signal of the H level is input to the semiconductor device 1 in powering on the semiconductor device 1, a situation in which a rising waveform is not input to the Schmitt buffer SB02 is apprehended. As described above, in the semiconductor device 1, the Schmitt buffer SB02 or SB03 generate the single pulse signal with differentiated waveforms in the capacitors C01 and C02 as triggers, and determines the logic of the signal output from the logic circuit 10. Therefore, when the DC signal is input before (or substantially at the same time when) powering on the semiconductor device 1, an output level of the semiconductor device 1 remains in error, and is not corrected. More specifically, even when the DC signal of the H level is input to the semiconductor device 1, the output signal is not changed from the L level.

Also, if the input signal does not match the output signal due to some factor when the DC signal is input to the semiconductor device 1 except at the time of powering on the semiconductor device 1, the mismatching cannot be corrected.

From the above viewpoints, there is required to periodically update (refresh) the logic level of the output signal when the DC signal is input to the semiconductor device 1.

Figure 7:
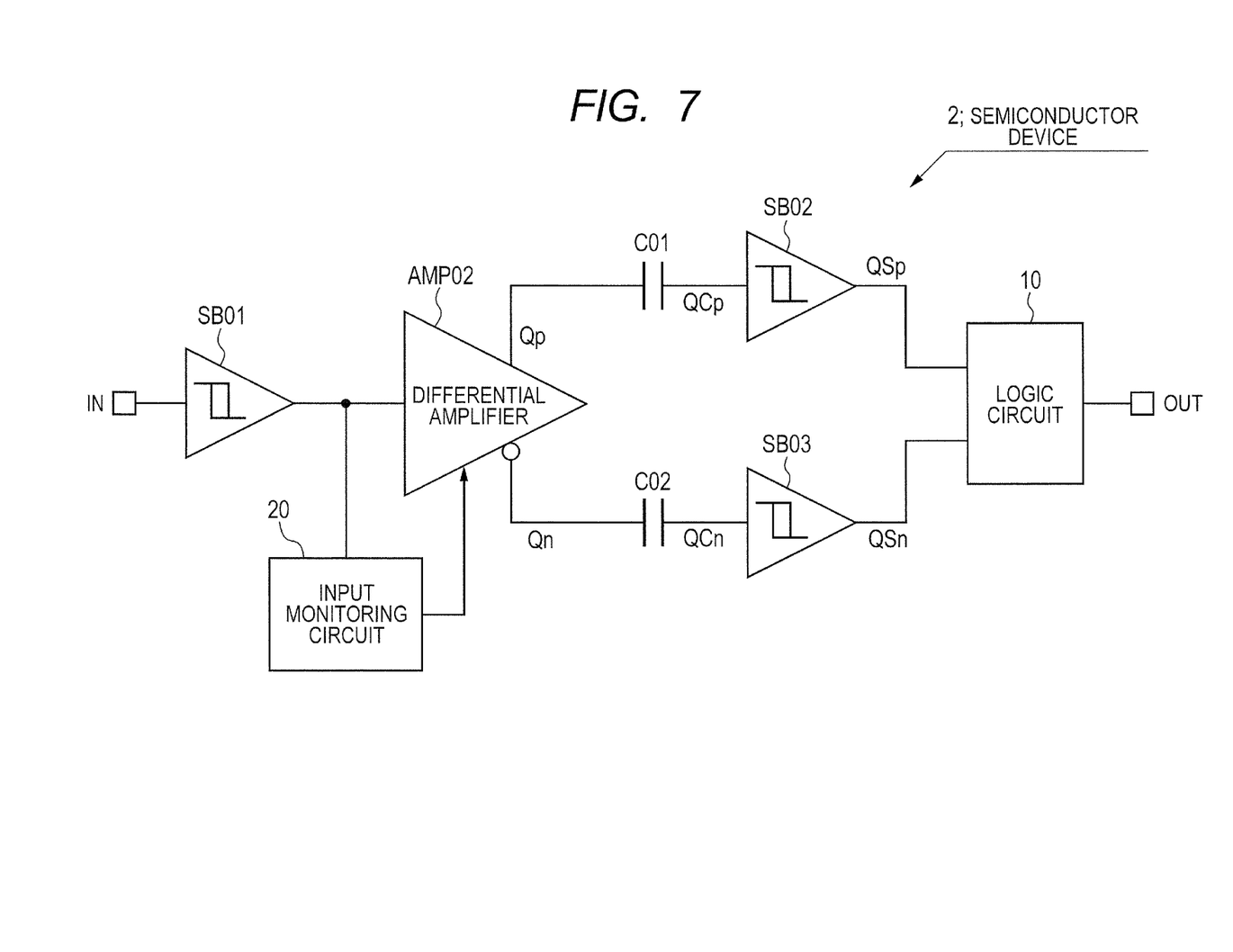
FIG. 7 is a diagram illustrating an example of a circuit configuration of a semiconductor device according to a second embodiment.

FIG. 7 is a diagram illustrating an example of a circuit configuration of a semiconductor device 2 according to this embodiment. Referring to FIG. 7, the same components as those in FIG. 2 are denoted by identical symbols, and their description will be omitted.

A difference between the semiconductor device 2 illustrated in FIG. 7 and the semiconductor device 1 resides in an input monitoring circuit 20, and a change of the differential amplifier AMP01 caused by the addition of the input monitoring circuit 20.

The input monitoring circuit 20 and a differential amplifier AMP02 monitor a potential of the input signal, and update the output of the logic circuit 10 if the potential of the input signal is not changed for a given time or longer (that is, when it can be determined as the DC signal). In this situation, the input monitoring circuit 20 locates a pulse signal to a non-inverting signal Qp or an inverting signal Qn which is output from the differential amplifier AMP02.

Figure 8:
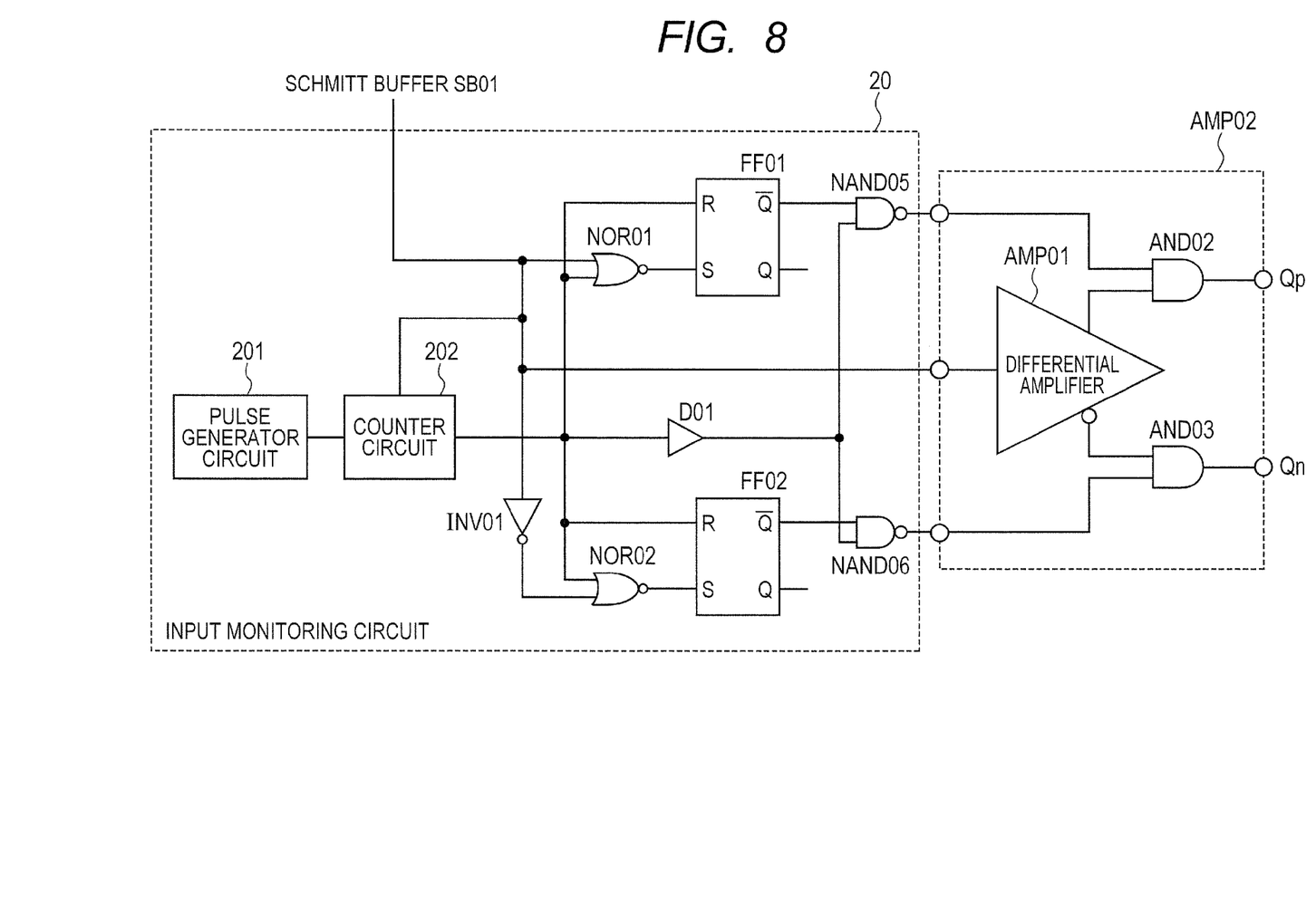
FIG. 8 is a diagram illustrating an example of a configuration of an input monitoring circuit and a differential amplifier.

FIG. 8 is a diagram illustrating an example of a configuration of the input monitoring circuit 20 and the differential amplifier AMP02.

The input monitoring circuit 20 includes a pulse generator circuit 201, a counter circuit 202, a logical NOT circuit INV01, NOR circuits NOR01, NOR02, flip-flops FF01, FF02, NAND circuits NAND05, NAND06, and a delay element D01.

The pulse generator circuit 201 generates a pulse signal having an arbitrary cycle, and supplies the generated pulse signal to the counter circuit 202. The pulse generator circuit 201 connects, for example, a plurality of inverters in series, and oscillates to generate the pulse signal.

The counter circuit 202 counts up the pulse signals supplied from the pulse generator circuit 201 to a predetermined count value, and then outputs a control signal of the H level from an output node (activates the control signal). After the counter circuit 202 has counted up the pulse signal to the count value, the counter circuit 202 initializes the counter, and outputs the control signal of the L level. Further, the counter circuit 202 receives a signal output by the Schmitt buffer SB01. The counter circuit 202 resets the counter every time the logic level of the signal output by the Schmitt buffer SB01 is changed.

The control signal output by the counter circuit 202 is supplied to the NOR circuits NOR01, NOR02, reset terminals of the flip-flops FF01, FF02, and the delay element D01.

The control signal output by the counter circuit 202 is delayed by the delay element D01. The delayed control signal is supplied to the NAND circuits NAND05 and NAND06. The delay element D01 is used to adjust timing of the signals supplied from the inverting data terminals of the flip-flops FF01 and FF02 to the NAND circuits NAND05 and NAND06, and the control signal output from the counter circuit 202. That is, the amount of delay of the delay element D01 is determined so that the control signal is supplied to the NAND circuits NAND05 and NAND06 in retard of the signal output from the inverting data terminals of the flip-flops FF01 and FF02. That is, the amount of delay of the delay element D01 is appropriately determined according to the amount of delay of the flip-flops FF01 and FF02. More specifically, for example, if the delay element D01 is configured by an even number of inverters, the number of inverters is appropriately changed.

The input monitoring circuit 20 receives a signal output by the Schmitt buffer SB01. The signal output by the Schmitt buffer SB01 is input to the NOR circuit NOR01. Also, a signal obtained by inverting the signal output by the Schmitt buffer SB01 through the logical NOT circuit INV01 is input to the NOR circuit NOR02.

The flip-flop FF01 receives a signal output by the NOR circuit NOR01 at a set terminal thereof, and outputs data to the NAND circuit NAND05 from an inverting data terminal thereof. Likewise, the flip-flop FF02 receives a signal output by the NOR circuit NOR02 at a set terminal thereof, and outputs data from an inverting data terminal thereof to the NAND circuit NAND06. Output signals of the NAND circuits NAND05 and NAND06 are supplied to the differential amplifier AMP02.

The differential amplifier AMP02 is configured to connect the AND circuits AND02 and AND03 to the differential amplifier AMP01. The AND circuit AND02 receives a signal output by the NAND circuit NAND05, and a non-inverting signal output by the differential amplifier AMP01. Likewise, the AND circuit AND03 receives a signal output by the NAND circuit NAND06, and a non-inverting signal output by the differential amplifier AMP01. An output of the AND circuit AND02 corresponds to the non-inverting signal Qp output by the differential amplifier AMP01. Likewise, an output of the AND circuit AND03 corresponds to the inverting signal Qn output by the differential amplifier AMP01.

The input monitoring circuit 20 outputs signals, which refresh the output of the differential amplifier AMP02, from the NAND circuits NAND05 and NAND06 if the input signal (output signal of the Schmitt buffer SB01) is not changed for a time corresponding to the count value set in the counter circuit 202. More specifically, if the input signal is H level for a given time or longer, the single pulse signal is output from the NAND circuit NAND05. On the other hand, if the input signal is L level for the given time or longer, the single pulse signal is output from the NAND circuit NAND06. The counter circuit 202 is used to determine whether the input signal is H level (or L level) for the given time or longer, or not, and the control signal output by the counter circuit 202 transitions to the H level to output the single pulse signals from the NAND circuits NAND05 and NAND06.

The differential amplifier AMP02 that has received those single pulse signals ANDs the output signal of the differential amplifier AMP01 and the received single pulse signals using the AND circuit AND02 or AND03. As a result, the non-inverting signal Qp and the inverting signal Qn output by the differential amplifier AMP02 become the single pulse signals having the same waveform as that of the single pulse signal output by the input monitoring circuit 20.

Figure 9:
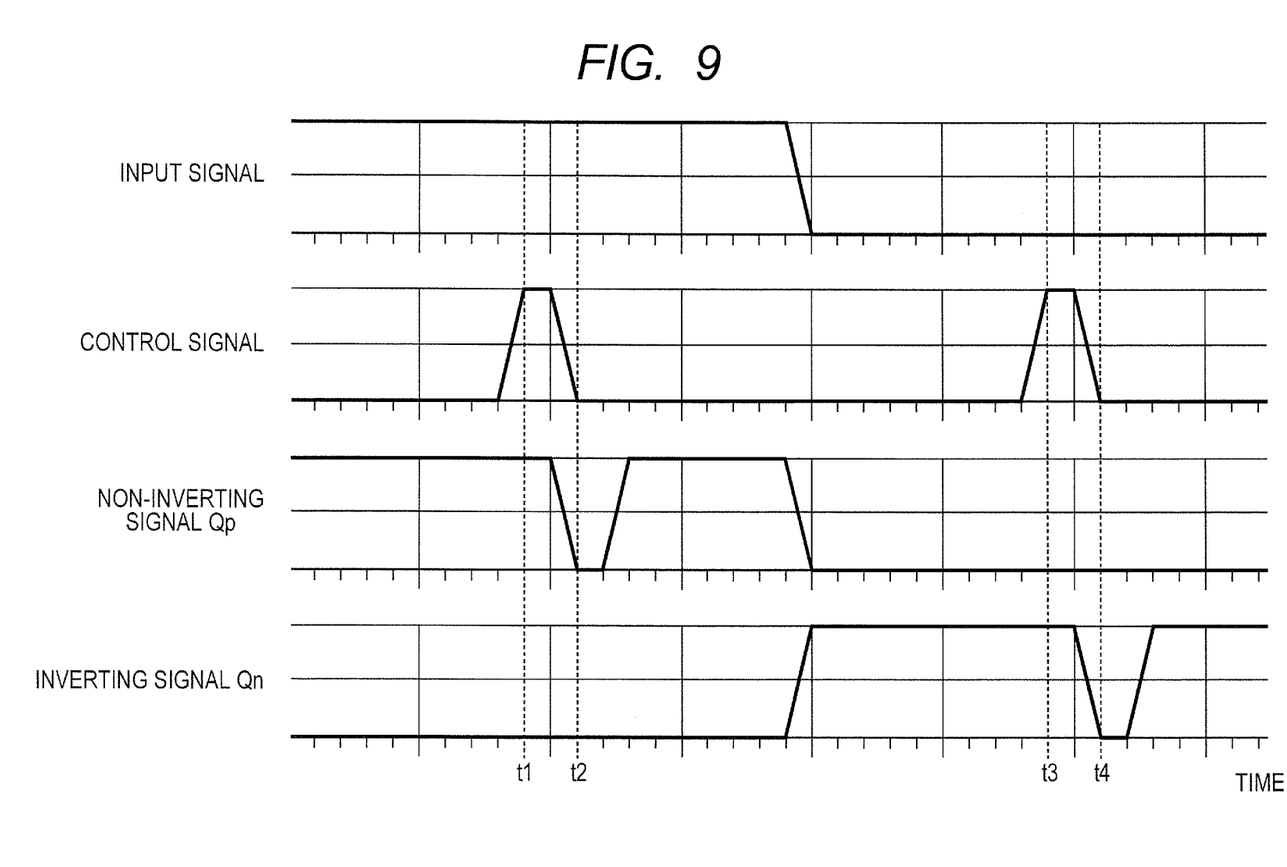
FIG. 9 is a diagram illustrating an example of output waveforms of the input monitoring circuit and the differential amplifier.

FIG. 9 is a diagram illustrating an example of the output waveforms of the input monitoring circuit 20 and the differential amplifier AMP02. As illustrated in FIG. 9, if the logic level of the input signal is not changed for the given time, the counter circuit 202 included in the input monitoring circuit 20 activates the control signal (times t1, t3). The non-inverting signal Qp or the inverting signal Qn output by the differential amplifier AMP02 transitions from the H level to the L level according to the activation of the control signal, and thereafter become the single pulse signals returning to the H level (times t2, t4).

Subsequently, the operation of the semiconductor device 2 will be described.

When the input signal is the AC signal, since there is no difference from the operation of the semiconductor device 1 described in the first embodiment, the description will be omitted. In this example, a case in which the DC signal is input to the semiconductor device 2 will be described.

FIG. 10 is a diagram illustrating an example of various signals in the semiconductor device 2.

The operation of the semiconductor device 2 at a time t1 in FIG. 10 is not different from the operation of the semiconductor device 1 described with reference to FIG. 5, and therefore a further description will be omitted.

Before the time t1, because the input signal is L level, and the control signal is also L level, a signal of the H level is input to the set terminal of the flip-flop FF01. Also, because the control signal output by the counter circuit 202 is L level, the reset terminal receives the signal of the L level. Therefore, a signal of the L level is output from the inverting data terminal. As a result, because both the signals of the L level are input to the NAND circuit NAND05, an output of the NAND circuit NAND05 becomes H level. Further, in a period between the times t1 and t2, because the output (input signal) of the Schmitt buffer SB01 is H level, the set terminal of the flip-flop FF01 receives the signal of the L level. Also, because the control signal output by the counter circuit 202 is L level, the reset terminal receives the signal of the L level. For that reason, there is no change in the logic level of the signal output by the inverting data terminal of the flip-flop FF1. That is, the signal output of the H level by the NAND circuit NAND05 is continued. Because the output of the NAND circuit NAND05 is H level, the non-inverting signal Qp output by the differential amplifier AMP02 matches the non-inverting signal output by the differential amplifier AMP01.

Subsequently, at the time t2 in FIG. 10, the input monitoring circuit 20 detects that the input signal is maintained at the H level for the given time or longer. That is, at the time t2, the counter circuit 202 included in the input monitoring circuit 20 outputs the control signal of the H level.

The control signal transitions to the H level with the result that the reset terminal of the flip-flop FF01 receives the signal of the H level. Because the signal received by the set terminal is L level, the signal of the H level is output from the inverting data terminal of the flip-flop FF01. Also, because the control signal is H level, the NAND circuit NAND05 receives both the signals of the H level. As a result, the signal output by the NAND circuit NAND05 becomes L level. When the output of the NAND circuit NAND05 becomes L level, the non-inverting signal Qp output by the differential amplifier AMP02 also becomes L level. Thereafter, the non-inverting signal Qp is maintained at the L level for a period (times t2 to t3) corresponding to the cycle of the pulse generator circuit 201.

At a time t3, the non-inverting signal QSp output by the Schmitt buffer SB02 becomes the single pulse signal according to a rising edge of the non-inverting signal Qp. On the other hand, since there is no change in the inverting signal Qn output by the differential amplifier AMP02, the inverting signal QSn output by the Schmitt buffer SB03 is maintained at the L level.

At the time t3, because the non-inverting signal QSp is H level, and the inverting signal QSn is L level, the logic circuit 10 outputs the output signal of the H level (refer to first column in FIG. 4). That is, the output of the logic circuit 10 is updated. In other words, the input monitoring circuit 20 detects that the input signal is maintained at the H level for the given time or longer, and causes the non-inverting signal QSp to generate a refresh pulse.

Before the time t3 in FIG. 10, because the output signal is H level, the logic level of the output signal is not changed. However, when the rising edge cannot be detected, and the output signal to be originally H level is L level immediately after powering on the power supply of the semiconductor device 2, an effect of generating the refresh pulse occurs. That is, when the input signal is maintained at the H level for the given time or longer, the semiconductor device 2 updates the output signal, and outputs the output signal of the H level. That is, the L level which is an erroneous output level can be corrected to the original H level.

Subsequently, a case in which the input signal is maintained at the L level for the given time or longer will be described.

At a time t4, the input signal transitions from the H level to the L level. Since the operation when the input signal transitions to the L level is not different from the operation of the semiconductor device 1 at the time t3 in FIG. 5, a further description will be omitted.

When the input signal is maintained at the L level for the given time or longer, the control signal output by the counter circuit 202, the NOR circuit NOR02, the flip-flop FF02, and the NAND circuit NAND06 cause the inverting signal Qn to generate the single pulse signal. A difference in generating the signals output from the NAND circuits NAND05 and NAND06 resides in that the input signal is inverted by the logical NOT circuit INV01, and input to the NOR circuit NOR02. Therefore, the flip-flop FF01, etc., make it possible to detect whether the input signal is maintained at the H level for the given time or longer, or not, and likewise the flip-flop FF02, etc., make it possible to detect whether the input signal is maintained at the L level for the given time or longer, or not.

At a time t5 in FIG. 10, the input monitoring circuit 20 detects that the input signal is maintained at the L level for the given time or longer. As a result, the signal output by the NAND circuit NAND06 in the input monitoring circuit 20 becomes L level. When the output of the NAND circuit NAND06 becomes L level, the inverting signal Qn output by the differential amplifier AMP02 also becomes L level. Thereafter, in a period between the times t5 and t6, the inverting signal Qn is maintained at the L level. On the other hand, the non-inverting signal Qp is maintained at the L level from the time t4, and also maintained at a time t6.

At the time t6, because the inverting signal Qn transitions to the H level, the logic circuit 10 outputs the output signal of the L level (refer to the second column in FIG. 4).

In this way, even when the input signal is maintained at the L level for the given time or longer, the semiconductor device 2 updates the output signal.

As described above, in the semiconductor device 2 according to this embodiment, when the logic level of the input signal is not changed (the potential is not changed) for the given time or longer, the output of the logic circuit 10 is periodically updated. As a result, even if the logic levels of the input signal and the output signal match each other, those logic levels can be corrected to the original logic levels. That is, even if the semiconductor device 2 malfunctions, the semiconductor device 2 can be recovered to a normal output state.

In the first and second embodiments, the semiconductor device that isolates the transmitter and the receiver from each other while suppressing the increase in the mounting area and the costs using the capacitors as the insulating elements, has been described above. In this example, the available insulating elements are not limited to the capacitors. For example, the capacitors can be replaced with coils to isolate the transmitter and the receiver from each other.

Figure 11:
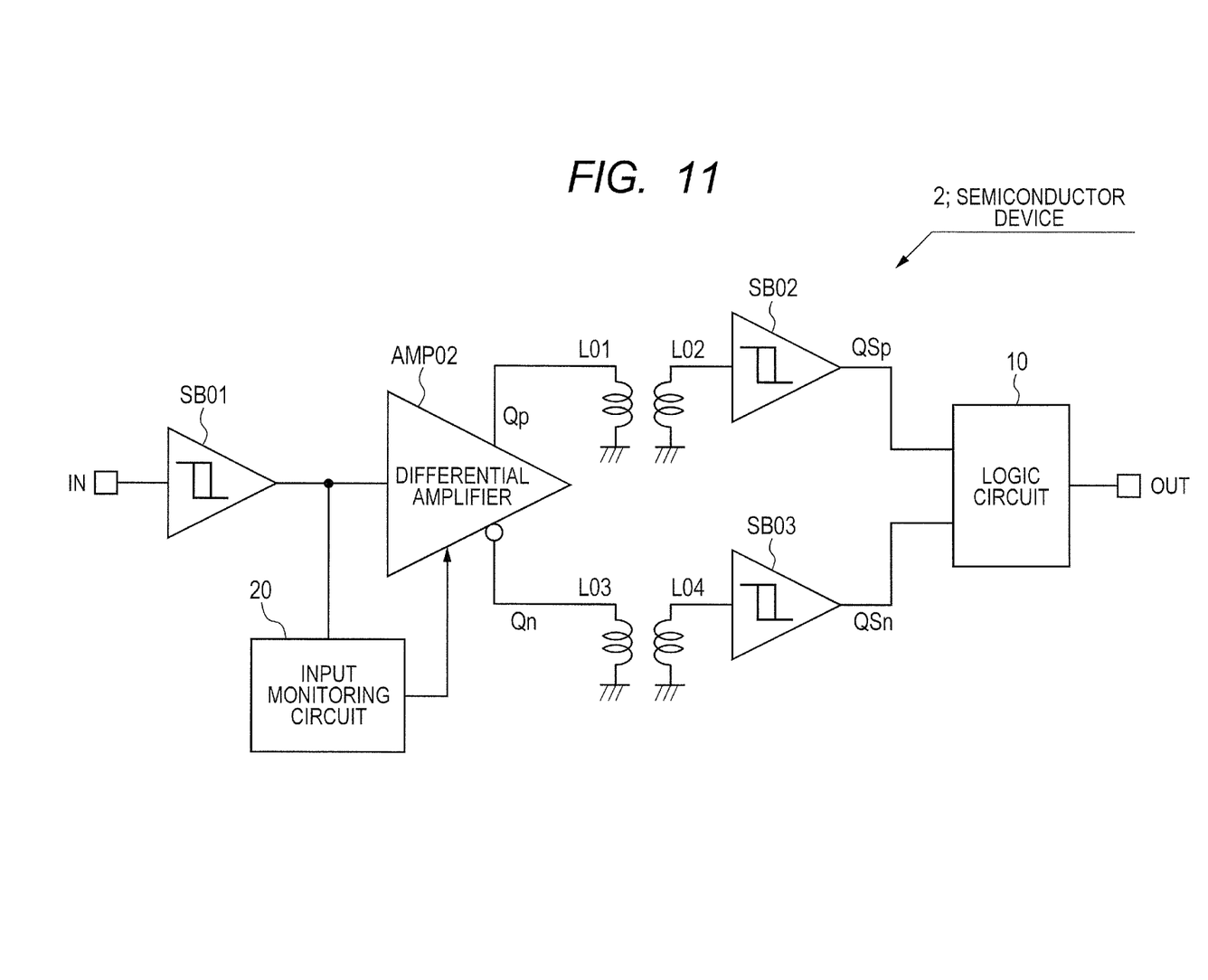
FIG. 11 is a diagram illustrating an example of a circuit configuration using a coil as an insulating element instead of a capacitor.

FIG. 11 illustrates an example of a circuit configuration using the coils as the insulating elements instead of the capacitors. Referring to FIG. 11, the same components as those in FIG. 7 are denoted by identical symbols, and their description will be omitted. As illustrated in FIG. 11, the coils can be used as the insulating elements instead of the capacitors. The capacitors C01 and C02 in the semiconductor device 1 can be changed to coils L01 to L04.

Further, in recent years, the development of the insulating elements using a microwave has been advanced, and the insulating elements of this type can be used instead of the capacitors.

The respective disclosures of the above applied Patent Literatures are each incorporated herein by reference in their entirety. Modifications and adjustments of the exemplary embodiments and examples are possible within the scope of the overall disclosure (including the claims) of the present disclosure and based on the basic technical concept of the present disclosure. Various combinations and selections of various disclosed elements (including the elements in each of the claims, examples, drawings, etc.) are possible within the scope of the claims of the present disclosure. That is, the present disclosure of course includes various variations and modifications that could be made by those skilled in the art according to the overall disclosure including the claims and the technical concept. Particularly, any numerical range disclosed herein should be interpreted that any intermediate values or subranges falling within the disclosed range are also specifically disclosed even without specific recital thereof.

What is claimed is:

1. A semiconductor device comprising:
    a first nonlinear element that outputs a first logic level if a potential of an input signal is equal to or larger than a given threshold value, and outputs a second logic level if the potential of the input signal is smaller than the given threshold value;
    a differential amplifier that generates a differential signal from a signal output by the first nonlinear element;
    a first insulating element that has one end connected to a non-inverting signal output terminal of the differential amplifier;
    a second insulating element that has one end connected to an inverting signal output terminal of the differential amplifier;
    a second nonlinear element that is connected to the other end of the first insulating element, outputs the first logic level if a potential of a non-inverting signal output by the differential amplifier is equal to or larger than the given threshold value, and outputs the second logic level if the potential of the non-inverting signal is smaller than the given threshold value;
    a third nonlinear element that is connected to the other end of the second insulating element, outputs the first logic level if the potential of an inverting signal output by the differential amplifier is equal to or larger than the given threshold value, and outputs the second logic level if the potential of the inverting signal is smaller than the given threshold value; and
    a logic circuit that outputs a logic level output by the second nonlinear element if the logic levels output by the second and third nonlinear elements are different from each other, and makes the logic level of the output signal unchangeable if the second and third nonlinear elements output the same logic level.

2. The semiconductor device according to claim 1, further comprising:
    an input monitoring circuit that allocates a single pulse signal to any one of the non-inverting signal and the inverting signal if the logic level of the input signal is continued for a given time or longer.

3. The semiconductor device according to claim 2, wherein the input monitoring circuit monitors the logic level of the input signal, and allocates the single pulse signal to the differential amplifier if the logic level of the input signal is continued for the given time or longer.

4. The semiconductor device according to claim 3, wherein the input monitoring circuit allows the single pulse signal to be generated from the non-inverting signal output terminal of the differential amplifier if the output of the first nonlinear element is the first logic level, and allows the single pulse signal to be generated from the inverting signal output terminal of the differential amplifier if the output of the first nonlinear element is the second logic level.

5. The semiconductor device according to claim 4,
    wherein the logic circuit includes an AND circuit, an exclusive OR circuit, and first to fourth NAND circuits,
    wherein the AND circuit receives a signal obtained by inverting a logic of the signal output by the second nonlinear element and the signal output by the third nonlinear element,
    wherein the exclusive OR circuit receives signals output by the second and third nonlinear elements,
    wherein the first NAND circuit receives the signals output by the AND circuit and the exclusive OR circuit,
    wherein the second NAND circuit receives the signals output by the first NAND circuit and the exclusive OR circuit,
    wherein the third NAND circuit receives the signals output by the first NAND circuit and the fourth NAND circuit,
    wherein the fourth NAND circuit receives the signals output by the second NAND circuit and the third NAND circuit,
    wherein the signal output by the third NAND circuit is the output signal.

6. The semiconductor device according to claim 5, wherein the input monitoring circuit includes a pulse generator circuit, a counter circuit, first and second NOR circuits, first and second flip-flops, and fifth and sixth NAND circuits,
    wherein the pulse generator circuit supplies a pulse signal having a given cycle to the counter circuit,
    wherein the counter circuit activates the control signal when counting the pulse signal supplied from the pulse generator circuit up to a predetermined count value,
    wherein the first NOR circuit receives the signal output by the first nonlinear element, and the control signal,
    wherein the second NOR circuit receives a signal obtained by inverting a logic of the signal output by the first nonlinear element, and the control signal,
    wherein the first flip-flop receives the control signal at a reset terminal, and receives the output of the first NOR circuit at a set terminal,
    wherein the second flip-flop receives the control signal at a reset terminal, and receives the output of the second NOR circuit at a set terminal,
    wherein the fifth NAND circuit receives the signal output from an inverting data terminal of the first flip-flop, and the control signal,
    wherein the sixth NAND circuit receives the signal output from an inverting data terminal of the second flip-flop, and the control signal,
    wherein the differential amplifier includes second and third AND circuits,
    wherein the second AND circuit outputs a signal obtained by ANDing the signal output from the non-inverting signal output terminal, and the signal output from the fifth NAND circuit as the non-inverting signal, and
    wherein the third AND circuit outputs a signal obtained by ANDing the signal output from the inverting signal output terminal, and the signal output from the sixth NAND circuit as the inverting signal.

7. The semiconductor device according to claim 1,
    wherein the first and second insulating elements each comprise an element that differentiate a change in physical quantity on one terminal thereof, and outputs the differentiated result to the other terminal thereof.

8. A semiconductor device, comprising:
a first nonlinear element that receives an input signal;
a differential amplifier that generates a differential signal from a signal output by the first nonlinear element;
first and second insulating elements each having one end connected to an output node of the differential amplifier;
second and third nonlinear elements each having an input node connected to the other ends of the first and second insulating elements, and output a single pulse signal according to a rising of the output signal of the differential amplifier; and
a logic circuit that updates a logic level of the output signal to a logic level of the input signal when detecting a difference of the logic level between the signals output by the second and third nonlinear elements.

9. The semiconductor device according to claim 8, wherein the logic circuit makes the logic level of the output signal unchangeable when detecting matching of the logic levels of the signals output by the second and third nonlinear elements.

10. The semiconductor device according to claim 1, wherein the logic circuit comprises an AND circuit, an exclusive OR circuit, and first to fourth NAND circuits.

11. The semiconductor device according to claim 1, wherein the first and the second insulating elements are first and second capacitors, respectively.

12. The semiconductor device according to claim 11, wherein the first and the capacitors block a DC signal, and allow passage of an AC signal.

13. The semiconductor device according to claim 1, wherein the first and the second nonlinear elements are first and second buffers, respectively.

14. The semiconductor device according to claim 13, wherein the first and the second buffers are configured to output H level when an input potential at an input node exceeds a first threshold value, and outputs L level when the input potential falls below a second threshold value.

15. The semiconductor device according to claim 8, wherein the logic circuit comprises an AND circuit, an exclusive OR circuit, and first to fourth NAND circuits.

16. The semiconductor device according to claim 8, wherein the first and the second insulating elements are first and second capacitors, respectively.

17. The semiconductor device according to claim 16, wherein the first and the capacitors block a DC signal, and allow passage of an AC signal.

18. The semiconductor device according to claim 8, wherein the first and the second nonlinear elements are first and second buffers, respectively.

19. The semiconductor device according to claim 18, wherein the first and the second buffers are configured to output H level when an input potential at an input node exceeds a first threshold value, and outputs L level when the input potential falls below a second threshold value.

* * * * *